US012780424B2

United States Patent
(12) United States Patent
Shekar et al.

(10) Patent No.: US 12,780,424 B2
(45) Date of Patent: Nov. 3, 2026

(54) NEXT GEN PASSENGER SERVICE UNIT

(71) Applicant: Goodrich Corporation, Charlotte, NC (US)

(72) Inventors: Sai Sankalp Shekar, Bengaluru (IN); Hemanth Raghav Gajendra, Bangalore (IN); Skandan Berikai Kuppan, Bangalore (IN)

(73) Assignee: Goodrich Lighting Systems, Inc, Phoenix, AZ (US)

( * ) Notice: Subject to any disclaimer, the term of this patent is extended or adjusted under 35 U.S.C. 154(b) by 485 days.

(21) Appl. No.: 18/457,683

(22) Filed: Aug. 29, 2023

(65) Prior Publication Data

US 2024/0400209 A1 Dec. 5, 2024

(30) Foreign Application Priority Data

Jun. 2, 2023 (IN) ............................ 202341038053

(51) Int. Cl.
*B64D 13/06* (2006.01)

(52) U.S. Cl.
CPC ...... *B64D 13/06* (2013.01); *B64D 2013/0651* (2013.01); *B64D 2013/067* (2013.01)

(58) Field of Classification Search
CPC .............. B64D 13/06; B64D 2013/003; B64D 2013/067; F24F 8/30
See application file for complete search history.

(56) References Cited

U.S. PATENT DOCUMENTS

| | | | | |
|---|---|---|---|---|
| 4,493,247 A * | 1/1985 | Wachsman | B64D 13/02 361/231 |
| 7,300,499 B1 | 11/2007 | Fleisher | |
| 10,345,016 B2 * | 7/2019 | Garing | F25B 21/04 |
| 2021/0332996 A1 | 10/2021 | Bender et al. | |
| 2023/0056170 A1 * | 2/2023 | Wang | F24F 8/10 |

FOREIGN PATENT DOCUMENTS

| | | |
|---|---|---|
| DE | 102020118472 | 1/2022 |
| EP | 2713114 | 11/2020 |
| JP | 2011168159 | 9/2011 |
| RU | 2448872 C2 | 4/2012 |
| WO | 2022207586 | 10/2022 |

OTHER PUBLICATIONS

European Patent Office, European Partial Search Report dated Oct. 1, 2024 in Application No. 24179527.7.
European Patent Office, European Search Report dated Dec. 23, 2024 in Application No. 24179527.7.

* cited by examiner

*Primary Examiner* — Allen R. B. Schult
(74) *Attorney, Agent, or Firm* — SNELL & WILMER L.L.P

(57) ABSTRACT

A passenger service unit including an ion emitter is disclosed herein. The passenger service unit includes an air outlet assembly, a control unit electronically coupled to the air distribution box, an air gasper assembly coupled to the air distribution box, and an ion emitter coupled to the air gasper assembly and electronically coupled to the control unit, wherein the ion emitter is configured to be controlled by the control unit.

20 Claims, 7 Drawing Sheets

NEXT GEN PASSENGER SERVICE UNIT

CROSS-REFERENCE TO RELATED APPLICATIONS

This application claims priority to, and the benefit of, India Provisional Patent Application No. 202341038053, filed Jun. 2, 2023 (DAS Code 96BA) and titled "NEXT GEN PASSENGER SERVICE UNIT," which is incorporated by reference herein in its entirety for all purposes.

FIELD

The present disclosure generally relates to systems for managing air quality in an aircraft, and more specifically, to using air ionizers in an aircraft.

BACKGROUND

Travel within aircraft includes the recirculation of air within the aircraft. Circulation of air within an enclosed space, such as aircraft, may include circulation of harmful pathogens (e.g., viruses, bacteria, etc.) and undesirable odors. Currently, commercial aircraft use air filters, including high efficiency particulate air (HEPA) filters, to filter the air during recirculation. Generally, air filters are placed at central locations and therefore may not have continuous effectiveness within the enclosed space. Furthermore, more effective air filters, such as HEPA filters, come with an increased cost both in terms of the replaceable filter itself as well as the energy used to force air through the air filter. Furthermore, air filters, including HEPA filters, typically do not remove odors from the air within the enclosed space.

SUMMARY

A passenger service unit is disclosed herein. The passenger service unit includes an air outlet assembly, a control unit electronically coupled to the air distribution box, an air gasper assembly coupled to the air distribution box, and an ion emitter coupled to the air gasper assembly and electronically coupled to the control unit, wherein the ion emitter is configured to be controlled by the control unit.

In various embodiments, the ion emitter is configured to be in an air flow passing through the air gasper assembly. In various embodiments, the ion emitter is perpendicular to the air flow passing through the air gasper assembly. In various embodiments, the air gasper assembly includes a base, a shield coupled to the base, and a spoke coupled to the base and the shield, wherein the ion emitter is coupled to the spoke.

In various embodiments, the passenger service unit further includes a plurality of ion emitters arranged around a circumference of the spoke, each of the plurality of ion emitters being perpendicular to a flow of air passing through the air gasper assembly. In various embodiments, the passenger service unit further includes a wire coupled to the spoke and configured to pass an electric voltage from the control unit to the ion emitter. In various embodiments, the control unit includes a voltage input having a first voltage and a voltage output having a second voltage that is greater than the first voltage, the voltage output being coupled to the ion emitter.

Also disclosed herein is an aircraft including a passenger seat and a passenger service unit installed over the passenger seat. The passenger service unit includes an air distribution box, a control unit electronically coupled to the air outlet assembly, an air gasper assembly coupled to the air distribution box, and an ion emitter coupled to the air gasper assembly and electronically coupled to the control unit, wherein the ion emitter is configured to be controlled by the control unit.

In various embodiments, the ion emitter is configured to be in an air flow passing through the air gasper assembly. In various embodiments, the ion emitter is perpendicular to the air flow passing through the air gasper assembly. In various embodiments, the air gasper assembly includes a base, a shield coupled to the base, and a spoke coupled to the base and the shield, wherein the ion emitter is coupled to the spoke. In various embodiments, the passenger service unit further includes a plurality of ion emitters arranged around a circumference of the spoke, each of the plurality of ion emitters being perpendicular to a flow of air passing through the air gasper assembly.

In various embodiments, the control unit includes a voltage input having a first voltage and a voltage output having a second voltage that is greater than the first voltage, the voltage output being coupled to the ion emitter. In various embodiments, the aircraft further includes an air condition system that provides an air flow to the air distribution box, wherein the ion emitter ionizes the air flow through the air gasper assembly.

Also disclosed herein is a system including an ion emitter, a graphical user interface, a control unit electronically coupled to the ion emitter, a processor electronically coupled to the control unit, and a memory operatively coupled to the processor, the memory comprising instructions stored thereon that, when executed by the processor, cause the processor to receive an input from the graphical user interface and send a signal to the control unit to adjust a voltage to the ion emitter in response to the input.

In various embodiments, the signal includes an instruction to increase a voltage output from the control unit to the ion emitter to increase a number of ions produced by the ion emitter. In various embodiments, the signal includes an instruction to decrease a voltage output from the control unit to the ion emitter to decrease a number of ions produced by the ion emitter. In various embodiments, the control unit includes a voltage input configured to receive a first voltage and a voltage output configured to output a second voltage, the second voltage being greater than the first voltage.

In various embodiments, the system further includes a passenger service unit, an air outlet assembly coupled to the passenger service unit, and an air gasper assembly coupled to the air distribution box, wherein the ion emitter is coupled to the air gasper assembly. In various embodiments, the control unit is coupled to the passenger service unit.

The foregoing features and elements may be combined in any combination, without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. While these exemplary embodiments are described in sufficient detail to enable those skilled in the art to practice the invention, it should be understood that other embodiments may be realized and that logical, chemical and mechanical changes may be made without departing from the spirit and scope of the invention. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Disclosed herein is a system for ionizing air within an aircraft cabin. The system includes a control unit coupled to a passenger service unit (PSU) that is installed over one or more passenger seats. In various embodiments, each PSU includes one or more air outlet assemblies for controlling a flow of air over the passenger seats. In various embodiments, each air outlet assembly includes one or more air gasper assemblies to control the flow the of air. In various embodiments, one or more ion emitters may be coupled to each of the one or more air outlet assemblies. In various embodiments, each ion emitter is coupled to the control unit. In various embodiments, each ion emitter ionizes the air as it flows through the air gasper assembly. In various embodiments, the ionized air improves the quality of the air within the aircraft cabin.

Figure 1:
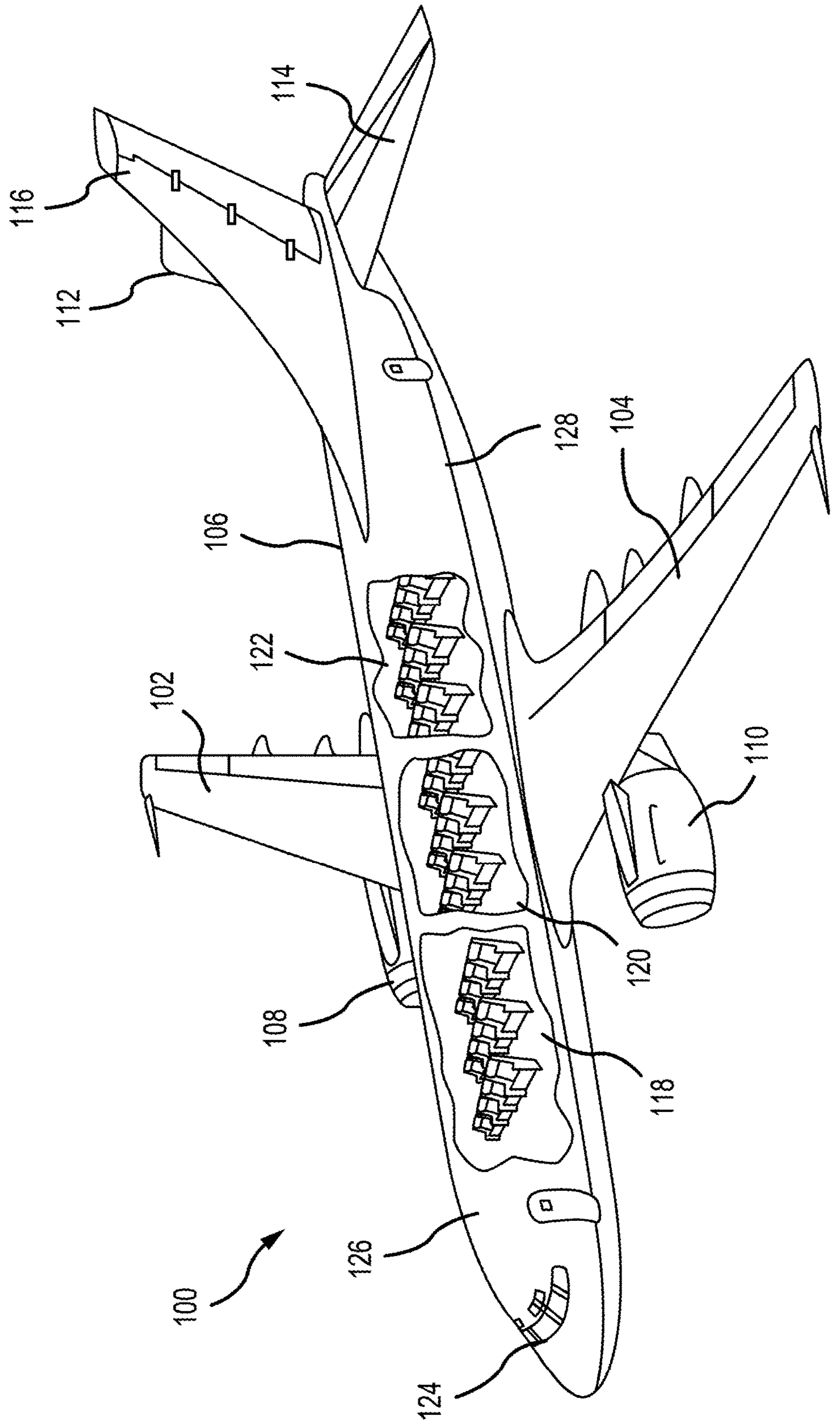
FIG. 1 illustrates an aircraft and various sections within the aircraft, in accordance with various embodiments.

Referring now to FIG. 1, an aircraft 100 including various sections within the aircraft is illustrated, in accordance with various embodiments. Aircraft 100 is an example of a passenger or transport vehicle in which smart air ionizers may be implemented in accordance with various embodiments. In various embodiments, aircraft 100 has a starboard wing 102 and a port wing 104 attached to a fuselage 106. In various embodiments, aircraft 100 also includes a starboard engine 108 connected to starboard wing 102 and a port engine 110 connected to port wing 104. In various embodiments, aircraft 100 also includes a starboard horizontal stabilizer 112, a port horizontal stabilizer 114, and a vertical stabilizer 116. In various embodiments, aircraft 100 also includes various cabin sections, including, for example, a first cabin section 118, a second cabin section 120, a third cabin section 122, and a pilot cabin 124. In various embodiments, cabin sections 118, 120, 122 may include a plurality of passenger seats and a plurality of passenger service units disposed over the plurality of passenger seats. In various embodiments, aircraft 100 may include a front lavatory 126 and/or a rear lavatory 128.

Figure 2:
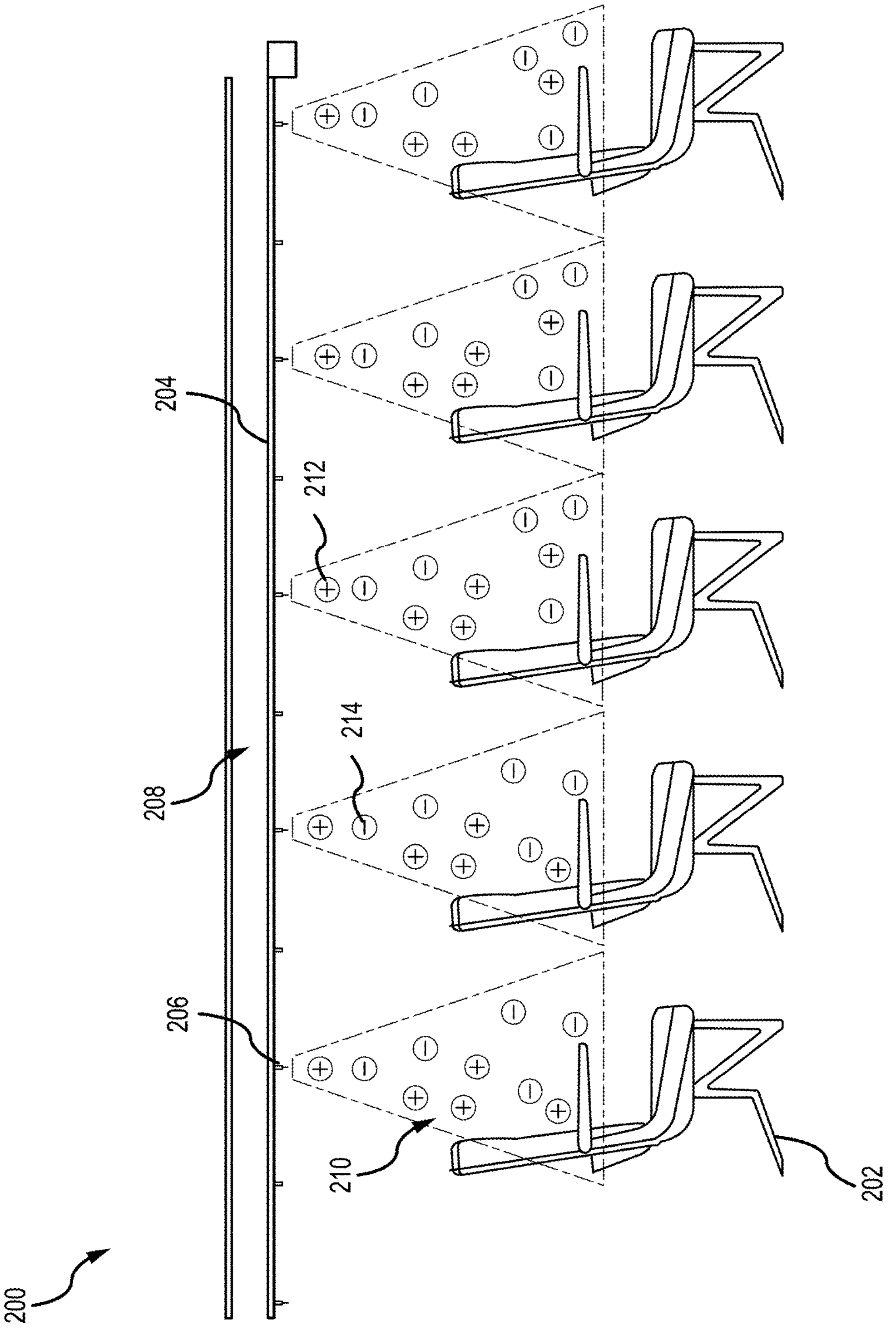
FIG. 2 illustrates a cabin of an aircraft including passenger seats and air ionizers, in accordance with various embodiments.

Referring now to FIG. 2, a side view of an aircraft cabin section 200 of an aircraft (e.g., aircraft 100) is illustrated, in accordance with various embodiments. In various embodiments, aircraft cabin section 200 may be an example of first cabin section 118, second cabin section 120, and/or third cabin section 122. Aircraft cabin section 200 includes a plurality of passenger seats 202, a plurality of passenger service units 204, and a plurality of ion emitters 206 disposed within the plurality of passenger service units 204, and an air conditioning duct 208 disposed above and coupled to the plurality of passenger service units 204.

The plurality of passenger seats 202 may be arranged in rows throughout aircraft cabin section 200. In various embodiments, one or more aisles may pass through each row of the plurality of passenger seats 202. The plurality of passenger service units 204 are disposed over the plurality of passenger seats 202. In various embodiment, each of passenger service unit of the plurality of passenger service units 204 may include a light, an air outlet, one or more ion emitters 206, and an attendant call button, among others. In various embodiments, the ion emitters are placed within a flow of air that passes through air conditioning duct 208, the plurality of passenger service units 204, and through one or more air gaspers in the plurality of passenger service units 204. Each ion emitter 206 ionizes the air in the flow of air creating an ionic region 210 over the plurality of passenger seats 202 that includes positive ions 212 and a plurality of negative ions 214.

In various embodiments, ion emitter 206, and more specifically, positive ions 212 may neutralize pathogens (e.g., bacteria, viruses, molds, dust, etc.) and/or malodor (i.e., unpleasant smells) that are airborne and on surfaces. Pathogens and malodor may be generated and/or spread by passengers and activities throughout aircraft 100 and cabin section 200, among other locations. Pathogens and malodor may be airborne and/or settle on surfaces within cabin section 200 and aircraft 100, among others. ion emitter 206 may be placed adjacent an air gasper so that ion emitter 206 ionizes the air exiting the air gasper. Generally, ions created by ion emitter 206, such as positive ions 212 and negative ions 214, have an active life span of about 30 seconds to about 75 seconds, and more specifically, about 45 seconds to about 60 seconds. Accordingly, locating ion emitter 206 adjacent the air gaspers improves the efficacy of positive ions 212 and negative ions 214 as compared to placing ion emitter 206 within air conditioning duct 208 or adjacent an air filter within the air handling system. In various embodiments, ion emitter 206 may be placed inside the air outlet assembly 208 and behind the air gasper or immediately adjacent the air gasper. In various embodiments, ion emitter 206 may be incorporated into the air gasper so ion emitter 206 and the air gasper operate as a single unit to ionize and disperse air throughout cabin section 200.

Figure 3:
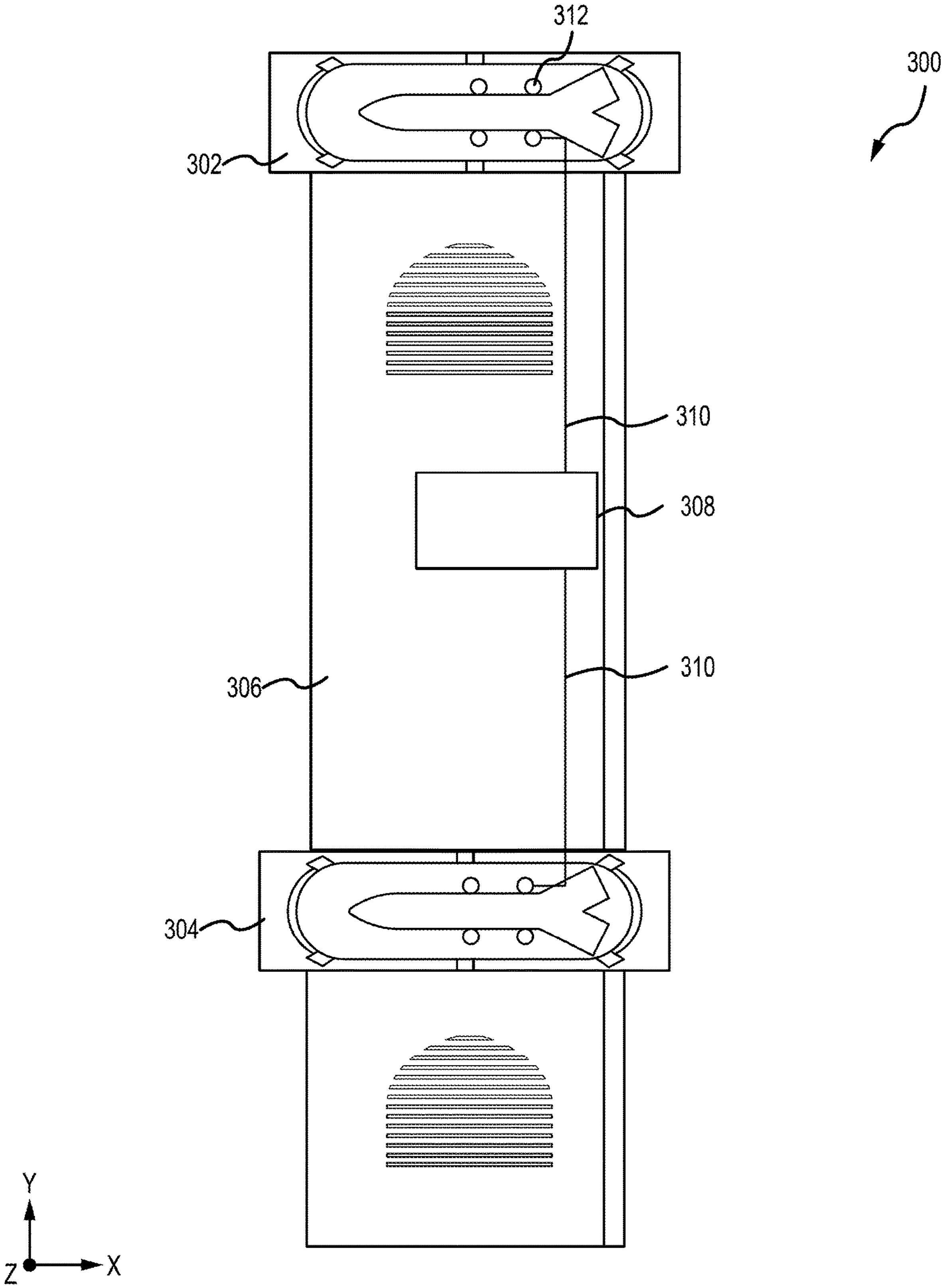
FIG. 3 illustrates a passenger service unit for use in a cabin of an aircraft, in accordance with various embodiments.

Referring now to FIG. 3, a top down view of a passenger service unit 300 is illustrated, in accordance with various embodiments. Passenger service unit 300 may be an example the plurality of passenger service units 204 described above in FIG. 2. Passenger service unit 300 may be installed over (e.g., in the positive z-direction) one or more passenger seats (e.g., passenger seats 202). In various embodiments, passenger service unit 300 may service two rows each having three passenger seats (e.g., passenger seats 202). In various embodiments, passenger service unit 300 may service more or fewer passenger seats (e.g., passenger seats 202) based on the cabin section (e.g., cabin section 200) and design of the aircraft (e.g., aircraft 100).

Passenger service unit 300 includes a first air outlet assembly 302, a second air outlet assembly 304, an infill panel 306, a control unit 308, and wiring 310, and a plurality of ion emitter 312. In the illustrated embodiment, four ion emitters 312 are fluidly coupled to first air distribution box 302 and four ion emitter 312 are fluidly coupled to second air distribution box 304. In various embodiments, more or fewer ion emitters 312 may be fluidly coupled to first air outlet assembly 302 and/or second air outlet assembly 304.

Infill panel 306 provides structural support for passenger service unit 300 as well as being a structure to which the other elements may be secured. First air outlet assembly 302 is located near a first end (e.g., the positive y-direction) of infill panel 306 and second air outlet assembly 304 is located near a second end (e.g., the negative y-direction). In various embodiments, control unit 308 may be coupled near the second end (e.g., the negative y-direction) of infill panel 306. In various embodiments, control unit 308 may be located anywhere along a length of infill panel 30-6 (e.g., along the y-axis), and preferably between first air outlet assembly 302 and second air outlet assembly 304. First air outlet assembly 302 and second air outlet assembly 304 are coupled to a top surface (e.g., in the positive z-direction) of infill panel and are located above the passengers' seats (e.g., passenger seats 202) and coupled to an air condition duct (e.g., air conditioning duct 208).

Control unit 308 is logically and electrically coupled to ion emitter 312 by wiring 310. Ion emitters 312 are coupled to first air distribution box 302 and second air distribution box 304. Control unit 308 controls each ion emitters 312 by adjusting a voltage, a current, a timing, and/or other parameters to increase or decrease a number of ions produced by each ion emitters 312. In various embodiments, increasing a voltage and/or a current to each ion emitters 312 increases the number of ions produced by ion emitters 312. In various embodiments, decreasing the voltage and/or the current to each ion emitters 312 decreases the number of ions produced by ion emitter 312. In various embodiments, control unit 308 may control each ion emitters 312 individually and/or as all together. In various embodiments, control unit 308 may step up a received alternating current (AC) or a direct current (DC) voltage to a high voltage for use by ion emitter 312. In various embodiments, control unit 308 may be connected to a 115 V AC power source. In various embodiments, control unit 308 may be connected to a 28 V DC power source. In various embodiments, control unit 308 may output about 2.5 KV to about 12.5 KV, and more specifically, about 5 KV to about 10 KV.

Control unit 308 may include one or more processors configured to implement various logical operations in response to execution of instructions, for example, instructions stored on a non-transitory, tangible, computer-readable medium. The one or more processors can be a general purpose processor, a microprocessor, a microcontroller, a digital signal processor (DSP), an application specific integrated circuit (ASIC), a field programmable gate array (FPGA) or other programmable logic device, discrete or transistor logic, discrete hardware components, or any combination thereof. Control unit 308 may further include memory to store data, executable instructions, system program instructions, and/or controller instructions to implement the control logic of the controller.

System program instructions and/or controller instructions may be loaded onto a non-transitory, tangible computer-readable medium having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se.

Figure 4A:
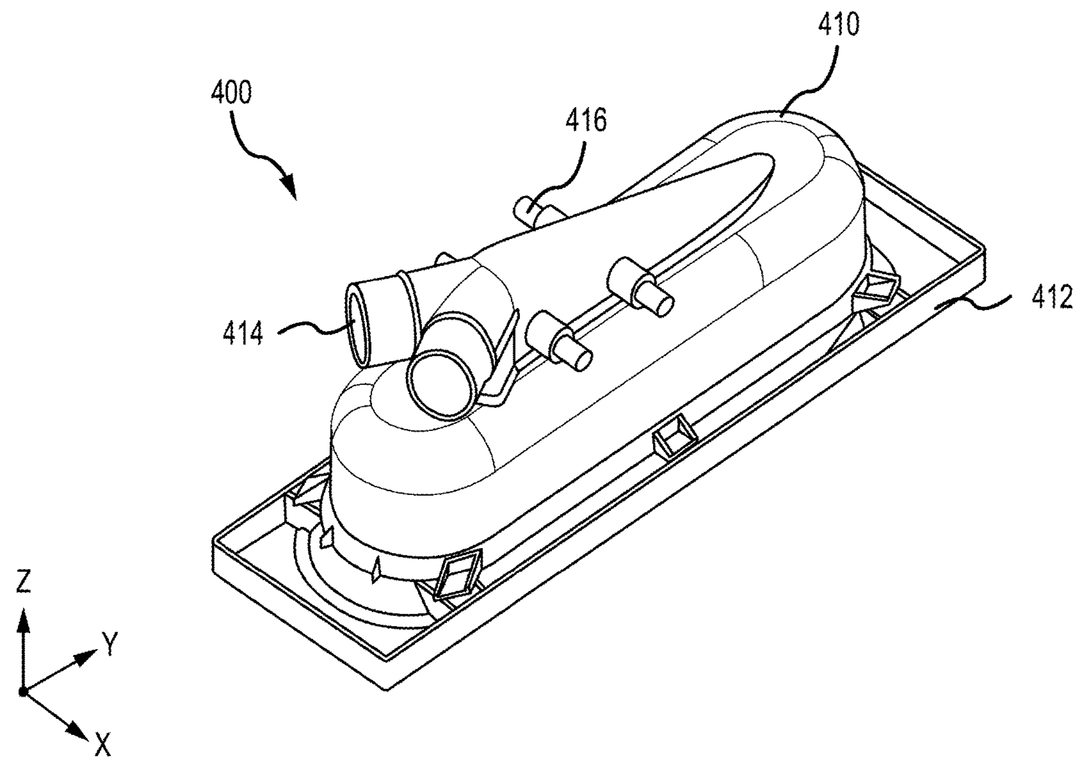
FIGS. 4A, 4B, 4C, and 4D illustrate components of a passenger service unit for use in a cabin of an aircraft, in accordance with various embodiments.
Figure 4B:
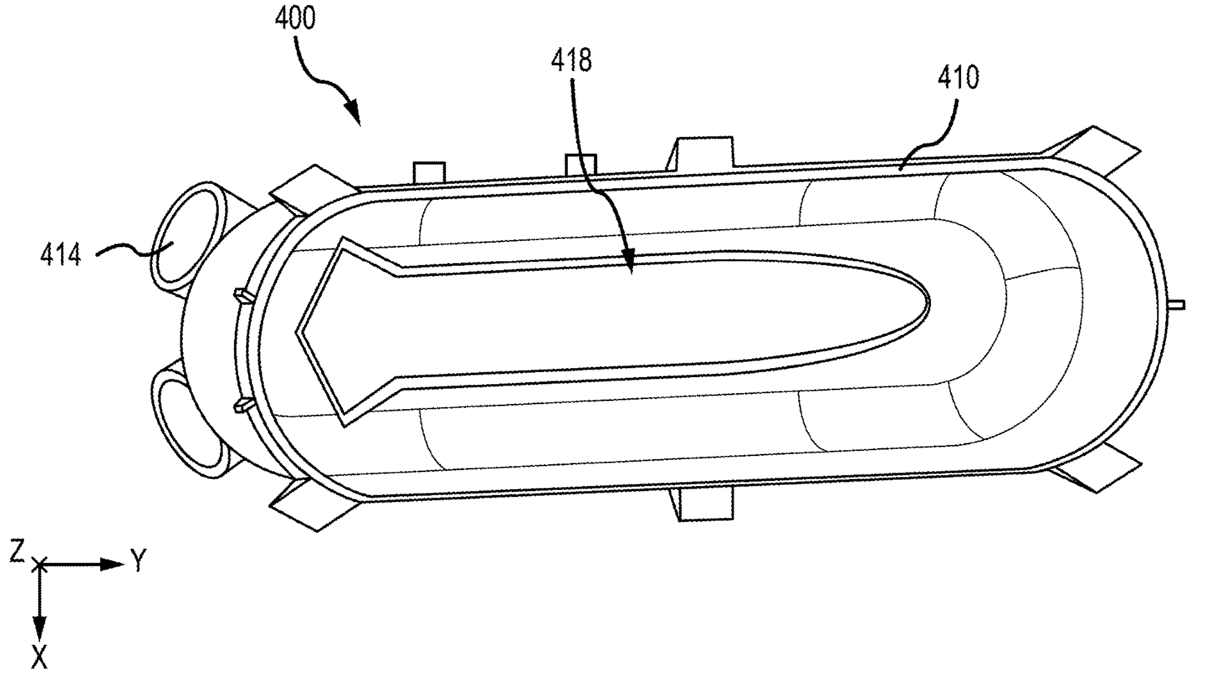
Figure 4C:
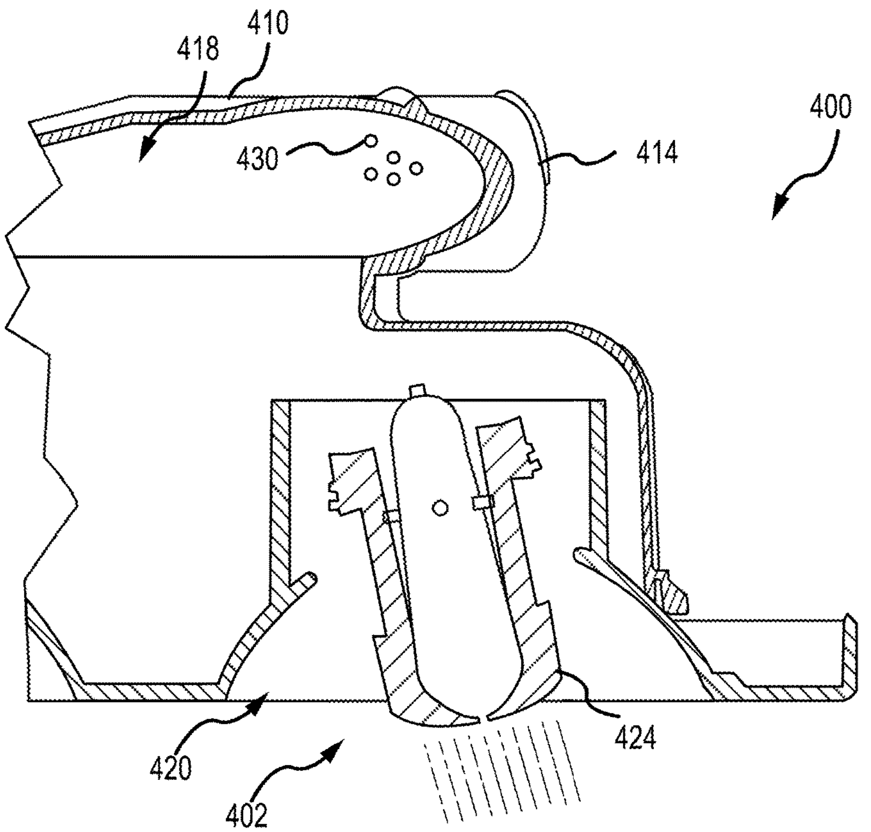
Figure 4D:
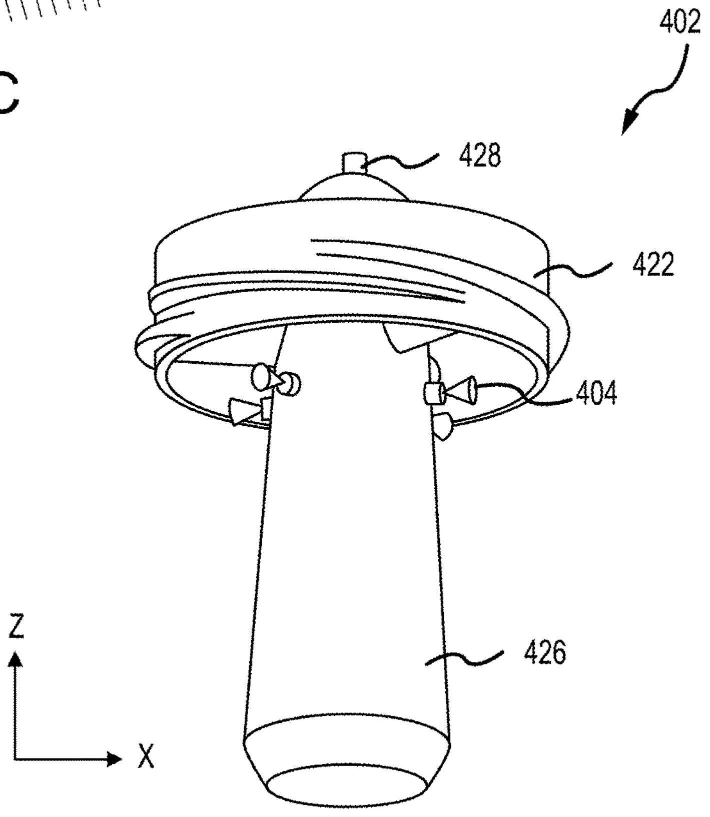

Referring now to FIGS. 4A-4D, an air outlet assembly 400 including one or more air gasper assemblies 402 and one or more ion emitters 404 is illustrated, in accordance with various embodiments. FIG. 4A is a perspective top view of air outlet assembly 400. FIG. 4B is a perspective bottom view of air outlet assembly 400. FIG. 4C is a cross section view of air gasper assembly 402 installed in air outlet assembly 400. FIG. 4D is a perspective view of the spoke 426 in an air gasper assembly 402 including ion emitters 404. In various embodiments, air outlet assembly 400 may be an example of first air outlet assembly 302 or second air outlet assembly 304 described above in FIG. 3. In various embodiments, ion emitters 404 may be examples of ion emitter 312 described above in FIG. 3.

Air outlet assembly 400 includes an air distribution box 410, a lower portion 412, air inlets 414, and one or more mount points 416 for mounting ion emitters 404. Air distribution box 410 defines a cavity 418 into which air flows from air inlets 414. Air flows through air inlets 414, into cavity 418, and out through one or more air gasper assemblies 402. Air distribution box 410 is configured to be coupled to lower portion 412. Lower portion 412 is configured to couple to infill panel 306. Air gasper assemblies 402 are configured to extend downward (e.g., in the negative z-direction) toward passengers and passenger seats (e.g., passenger seats 202). An opening 420 is formed in lower portion 412 for each air gasper assembly 402.

Air gasper assembly 402 includes a base 422, a shield 424, and a spoke 426. Base 422 is coupled to lower portion 412, and more specifically, to opening 420 within lower portion 412. In various embodiments, base 422 is configured to allow movement so that a passenger may position the flow of air in a desired direction. Shield 424 and spoke 426 are coupled to base 422 and work together to increase or decrease the flow of air through air gasper assembly 402. In various embodiments, shield 424 is rotatably coupled to base 422 around spoke 426 so that rotating shield 424 in a first direction (e.g., counterclockwise) increases a flow of air and rotating shield 424 in a second direction (e.g., clockwise) decreases the flow of air.

In various embodiments, one or more ion emitters 404 are mounted to air distribution box 410 of air outlet assembly 400 (as illustrated in FIG. 3) and extend into cavity 418. In various embodiments, one or more ion emitters 404 are mounted to air inlet 414 (as illustrated in FIGS. 4A and 4B) and extend into cavity 418. Each of the ion emitters 404 mounted to upper portion 410 are connected to control unit 308 by wiring 310.

In various embodiments, air gasper assembly 402 includes one or more ion emitters 404 mounted to spoke 426. In various embodiments, the one or more ion emitters 404 are mounted to an upper portion (e.g., in the positive z-direction) of spoke 426 to be close to the flow of air. In various embodiments, ion emitters 404 may be radially placed perpendicular to a direction of an air flow. That is, one or more ion emitters 404 may be place around a circumference of spoke 426 and extend outward from spoke 426 to be perpendicular to the direction of the flow of air through air gasper assembly 402. In various embodiments, ion emitter 404 may be radially placed at a non-perpendicular angle to a direction of an air flow. Air gasper assembly 402 further includes a wire 428 coupled to base 422 and extending through spoke 426 to each ion emitter 404. Wire 428 is connected to control unit 308.

Ion emitters 404 are configured to ionize the air as it passes by ion emitter 404. In various embodiments, the air is ionized, producing positive and negative ions, with essentially no ozone being produced even with the high voltage used by ion emitter 404. As illustrated in FIG. 4C, an air flow 430 enters air outlet assembly 400 through air inlet 414, passes through cavity 418, and is ionized as it passes by ion emitters 404 coupled to spoke 426 of air gasper assembly 402. As described herein, placing ion emitters 404 within air gasper assembly 402 improves the efficiency and efficacy of ions that are emitted by being close to the passengers. Placing ion emitters 404 at the air outlet, rather than a central air controller, provides the ionized air flow in close proximity to where it may benefit passengers. There are fewer surfaces between ion emitters 404 and the passengers to which the ionized air may attach itself. This is important as the ions in the air flow, and thus the ionized air flow, has a low residence time (i.e., low life span) that is about 20 seconds to about 60 seconds.

Figure 5:
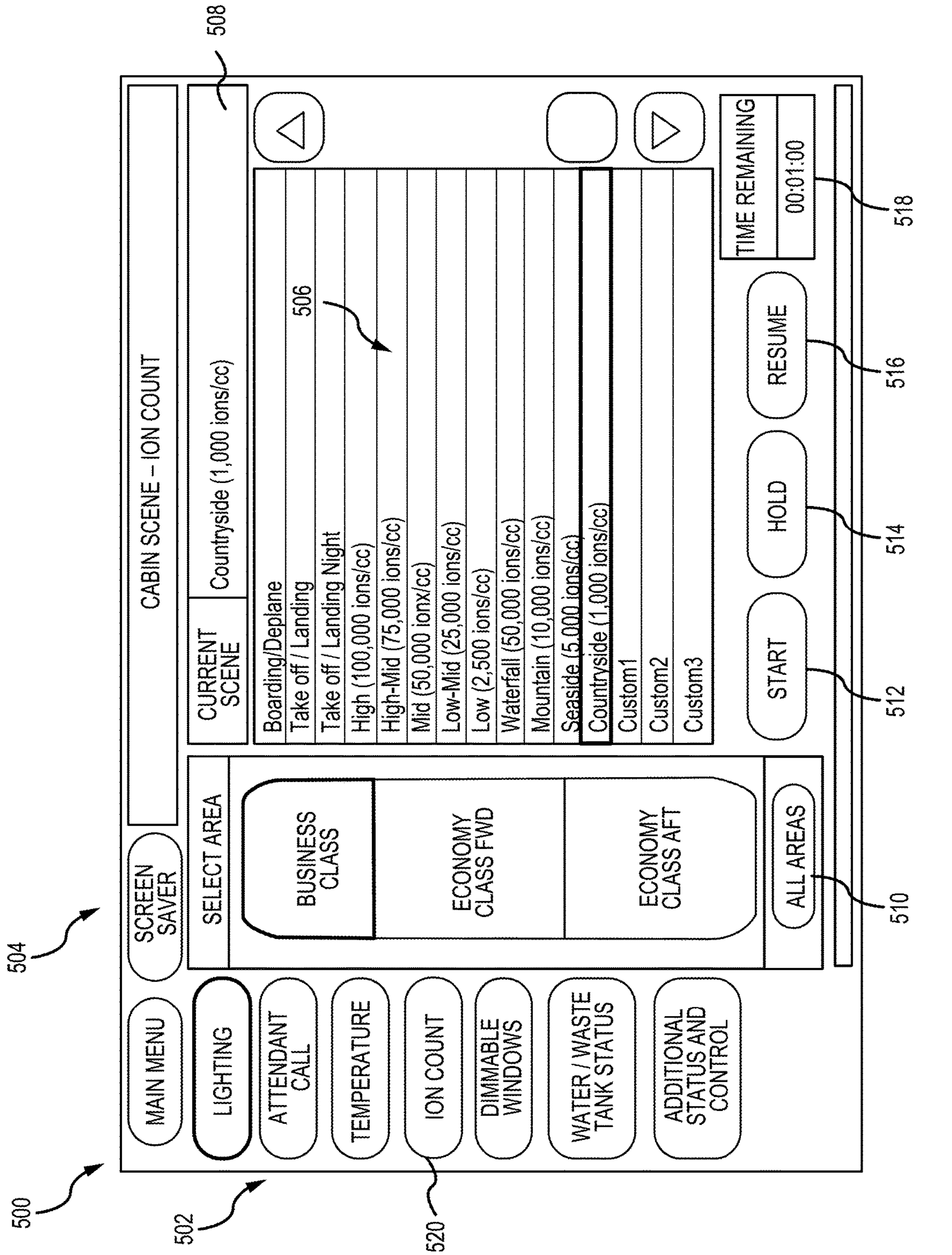
FIG. 5 illustrates a user interface for controlling an air ionizer in a passenger service unit, in accordance with various embodiments.

Referring now to FIG. 5, a graphical user interface, GUI 500, for controlling one or more air ionizers is illustrated, in accordance with various embodiments. In various embodiments, GUI 500 may communicate with control unit 308. In various embodiments, the one or more air ionizers may be examples of ion emitters 206 described above in FIG. 2. In various embodiments, the one or more air ionizers may be examples of ion emitter 312 described above in FIG. 3. In various embodiments, the one or more air ionizers may be examples of ion emitters 404 described above in FIGS. 4A-4D. It should be appreciated that GUI 500 as described below is not intended to be limiting, but to be exemplary one implementation of a user interface for controlling one or more air ionizers and is for case of discussion. As such, GUI 500 may be presented differently and/or provide more or less functionality than what is discussed below.

GUI 500 includes an options menu 502, a cabin area selector 504, a scene selector 506, a current scene indicator 508, an all areas button 510, a start button 512, a hold button 514, a resume button 516, and a timer 518. Options menu 502 provides a crew member the ability to control different aspects of the cabin including lighting, temperature, windows, and ion count and to view status of the cabin including attendant call button and water status. Cabin area selector 504 allow the crew member to select which cabin section to monitor such as business class, economy class forward, and economy class aft. Pressing all areas button 510 may select all cabin areas for adjustment.

Selecting ion count 520 presents the crew member with scene selector 506 and current scene indicator 508. In various embodiments, scene selector 506 may present the crew member with different scenes to adjust the number of ions being generated by air ionizers and ion emitters (e.g., ion emitter 404) within each cabin area. As illustrated, scene selector 506 presents the cabin crew with different options such as "Boarding/Deplane", "Take off/Landing", "Take off/Landing Night", "High", "High-Mid", "Mid", "Mid-Low", "Low", "Waterfall", "Mountain", "Seaside", "Countryside", "Custom1", "Custom2", and "Custom3". The selections in scene selector 506 are intended to simplify the control of the air ionizers for the cabin crew. As illustrated, the different scenes may produce different numbers of ions depending on the current state of the cabin area. For example, the cabin crew may select "Countryside" or "Low" in response to normal conditions within the cabin area. The cabin crew may select "High" or "Waterfall" in response to a malodor within the cabin area (e.g., a soiled diaper, garbage, lavatory, etc.). Doing so provides the cabin crew the ability to adjust the number of ions per cubic centimeter (ions/cc) to a level that is comfortable for the passengers by increasing or decreasing the voltage supplied to each ion emitter (e.g., ion emitter 404).

Start button 512 may change the selected scene. Hold button 514 may pause the selected scene for a time. Resume button 516 may resume the selected scene after being on hold. Timer 518 may provide an indication of how long the selected scene has been running or on hold.

Figure 6:
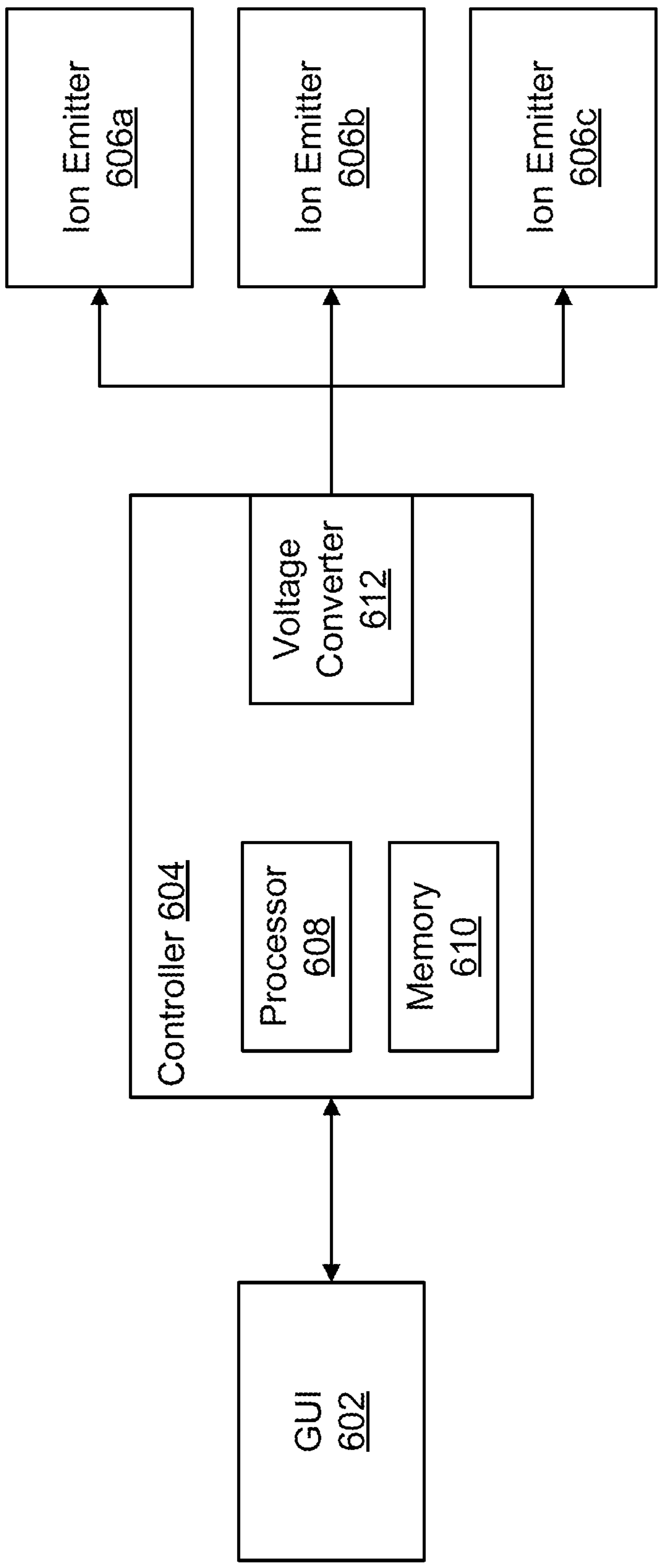
FIG. 6 illustrates a system for controlling an air ionizer in a passenger service unit, in accordance with various embodiments.

Referring now to FIG. 6, a system 600 for controlling one or more air ionizers is illustrated, in accordance with various embodiments. System 600 includes a graphical user interface (GUI) 602, a controller 604, and ion emitters 606*a*-606*c*. In various embodiments, GUI 602 may be an example of GUI 500 described above in FIG. 5. In various embodiments, controller 604 may be an example of control unit 308 described above in FIG. 3. In various embodiments, controller 604 may be an example of a central aircraft controller or other server. In various embodiments, ion emitters 606*a*-606*c* may be examples of ion emitter 404 described in FIGS. 4A-4D. In various embodiments, ion emitters 606*a*-606*c* may be examples of ion emitter 206 described above in FIG. 2.

Controller 604 includes a processor 608, a memory 610, and a voltage converter 612. Processor 608 is configured to communicate with GUI 602 to receive commands from a crew member and to control ion emitters 606*a*-606*c* in response to the received commands. Memory 610 is configured to store data from GUI 602 and processor 608. Voltage converter 612 is configured to receive commands from processor 608 and convert an input voltage (e.g., 28 VDC, 115 VAC) to a high voltage output (e.g., 10 kV DC) for use by ion emitters 606*a*-606*c*).

Processor 608 may comprise one or more processors configured to implement various logical operations in response to execution of instructions, for example, instructions stored on a non-transitory, tangible, computer-readable medium. The one or more processors can be a general purpose processor, a microprocessor, a microcontroller, a digital signal processor (DSP), an application specific integrated circuit (ASIC), a field programmable gate array (FPGA) or other programmable logic device, discrete or transistor logic, discrete hardware components, or any combination thereof. Memory 610 may comprise memory to store data, executable instructions, system program instructions, and/or controller instructions to implement the control logic of processor 608.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods, and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Numbers, percentages, or other values stated herein are intended to include that value, and also other values that are about or approximately equal to the stated value, as would be appreciated by one of ordinary skill in the art encompassed by various embodiments of the present disclosure. A stated value should therefore be interpreted broadly enough to encompass values that are at least close enough to the stated value to perform a desired function or achieve a desired result. The stated values include at least the variation to be expected in a suitable industrial process, and may include values that are within 5% of a stated value. Additionally, the terms "substantially," "about" or "approximately" as used herein represent an amount close to the stated amount that still performs a desired function or achieves a desired result. For example, the term "substantially," "about" or "approximately" may refer to an amount that is within 5% of a stated amount or value.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above-described concepts can be used alone or in combination with any or all of the other above-described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A passenger service unit, comprising:

an air outlet assembly, wherein the air outlet assembly comprises:
- an air distribution box, wherein the air distribution box defines a cavity;
- a lower portion;
- air inlets; and
- one or more mount points;

a control unit electronically coupled to the air outlet assembly;

an air gasper assembly coupled to the air outlet assembly;

a first set of ion emitters mounted to the air distribution box via the one or more mount points of the air outlet assembly, the first set of ion emitters extending into the cavity of the air distribution box, the first set of ion emitters electronically coupled to the control unit, wherein the first set of ion emitters are configured to be controlled by the control unit; and a second set of ion emitters coupled to the air gasper assembly and electronically coupled to the control unit, wherein the second set of ion emitters are configured to be controlled by the control unit.

2. The passenger service unit of claim 1, wherein the second set of ion emitters are configured to be in an air flow passing through the air gasper assembly.

3. The passenger service unit of claim 2, wherein the second set of ion emitters are perpendicular to the air flow passing through the air gasper assembly.

4. The passenger service unit of claim 1, wherein the air gasper assembly comprises:

a base;

a shield coupled to the base; and a spoke coupled to the base and the shield, wherein the second set of ion emitters are coupled to the spoke.

5. The passenger service unit of claim 4, wherein the second set of ion emitters are arranged around a circumference of the spoke, each of the second set of ion emitters being perpendicular to a flow of air passing through the air gasper assembly.

6. The passenger service unit of claim 4, further comprising:

a wire coupled to the spoke and configured to pass an electric voltage from the control unit to the second set of ion emitters.

7. The passenger service unit of claim 1, wherein the control unit comprises:

a voltage input having a first voltage; and a voltage output having a second voltage that is greater than the first voltage, the voltage output being coupled to the first set of ion emitters and the second set of ion emitters.

8. An aircraft, comprising:

a passenger seat;

a passenger service unit installed over the passenger seat, the passenger service unit including:

an air outlet assembly, wherein the air outlet assembly comprises:

an air distribution box, wherein the air distribution box defines a cavity;

a lower portion;

air inlets; and one or more mount points;

a control unit electronically coupled to the air outlet assembly;

an air gasper assembly coupled to the air outlet assembly; and a first set of ion emitters mounted to the air distribution box via the one or more mount points of the air outlet assembly, the first set of ion emitters extending into the cavity of the air distribution box, the first set of ion emitters electronically coupled to the control unit, wherein the first set of ion emitters are configured to be controlled by the control unit;

a second set of ion emitters coupled to the air gasper assembly and electronically coupled to the control unit, wherein the second set of ion emitters are configured to be controlled by the control unit.

9. The aircraft of claim 8, wherein the second set of ion emitters are configured to be in an air flow passing through the air gasper assembly.

10. The aircraft of claim 9, wherein the second set of ion emitters are perpendicular to the air flow passing through the air gasper assembly.

11. The aircraft of claim 8, wherein the air gasper assembly comprises:

a base;

a shield coupled to the base; and a spoke coupled to the base and the shield, wherein the second set of ion emitters are coupled to the spoke.

12. The aircraft of claim 11, wherein the second set of ion emitters are arranged around a circumference of the spoke, each of the second set of ion emitters being perpendicular to a flow of air passing through the air gasper assembly.

13. The aircraft of claim 8, wherein the control unit comprises:

a voltage input having a first voltage; and a voltage output having a second voltage that is greater than the first voltage, the voltage output being coupled to the first set of ion emitters and the second set of ion emitters.

14. The aircraft of claim 8, further comprising:

an air condition system that provides an air flow to the air distribution box.

15. A system, comprising:

a first set of ion emitters mounted to an air distribution box of an air outlet assembly via one or more mount points of the air outlet assembly, the first set of ion emitters extending into a cavity of the air distribution box;

a second set of ion emitters coupled to an air gasper assembly, a graphical user interface;

a control unit electronically coupled to the first set of ion emitters and the second set of ion emitters;

a processor electronically coupled to the control unit; and a memory operatively coupled to the processor, the memory comprising instructions stored thereon that, when executed by the processor, cause the processor to:

receive an input from the graphical user interface; and send a signal to the control unit to adjust a voltage to at least one of the first set of ion emitters or the second set of ion emitters in response to the input.

16. The system of claim 15, wherein the signal includes an instruction to increase a voltage output from the control unit to the at least one of the first set of ion emitters or the second set of ion emitters to increase a number of ions produced by the at least one of the first set of ion emitters or the second set of ion emitters.

17. The system of claim 15, wherein the signal includes an instruction to decrease a voltage output from the control unit to the at least one of the first set of ion emitters or the second set of ion emitters to decrease a number of ions produced by the at least one of the first set of ion emitters or the second set of ion emitters.

18. The system of claim 15, wherein the control unit comprises:

a voltage input configured to receive a first voltage; and a voltage output configured to output a second voltage, the second voltage being greater than the first voltage.

19. The system of claim 15, further comprising:

a passenger service unit;

the air outlet assembly coupled to the passenger service unit; and the air gasper assembly coupled to the air outlet assembly.

20. The system of claim 19, wherein the control unit is coupled to the passenger service unit.

* * * * *